United States Patent
Dubinsky

(10) Patent No.: US 8,150,538 B2
(45) Date of Patent: *Apr. 3, 2012

(54) TRIGGERING AND ACTIVATING DEVICE FOR TWO COUPLED CONTROL SYSTEMS THAT CAN BE MUTUALLY ACTIVATED, AND CORRESPONDING METHOD

(75) Inventor: William J. Dubinsky, Hoboken, NJ (US)

(73) Assignee: Swiss Reinsurance Company Ltd., Zurich (CH)

( * ) Notice: Subject to any disclaimer, the term of this patent is extended or adjusted under 35 U.S.C. 154(b) by 430 days.

This patent is subject to a terminal disclaimer.

(21) Appl. No.: 12/295,835

(22) PCT Filed: Mar. 13, 2007

(86) PCT No.: PCT/EP2007/052362
§ 371 (c)(1),
(2), (4) Date: Mar. 26, 2009

(87) PCT Pub. No.: WO2007/115884
PCT Pub. Date: Oct. 18, 2007

(65) Prior Publication Data
US 2009/0204235 A1 Aug. 13, 2009

(51) Int. Cl.
*G06F 19/00* (2011.01)

(52) U.S. Cl. ........................................... 700/21; 700/79

(58) Field of Classification Search .................. 700/21, 700/79
See application file for complete search history.

(56) References Cited

U.S. PATENT DOCUMENTS

| | | | |
|---|---|---|---|
| 7,899,560 B2* | 3/2011 | Eck | 700/21 |
| 2009/0307012 A1* | 12/2009 | Delavy et al. | 705/4 |
| 2010/0179451 A1* | 7/2010 | Hately et al. | 600/595 |

* cited by examiner

*Primary Examiner* — Ryan Jarrett
(74) *Attorney, Agent, or Firm* — Oblon, Spivak, McClelland, Maier & Neustadt, L.L.P.

(57) ABSTRACT

A triggering and activating device and an automated process coupling two reciprocally activatable monitoring devices or operational-intervention devices. A first synchronizing module synchronizes transmissible operational-intervention parameters of a lookup table with operational devices assigned to the first monitoring device, and a second synchronizing module synchronizes storable threshold-value parameters for activating the second monitoring device. Physical measuring parameters of intervention events are detected and transmitted to the activating device, an intervention-event stack being correspondingly incremented by a first filter module based on the physical measuring parameters and a dynamically implemented weighting of the lookup table. By the first filter module, based on the synchronized threshold parameters and the intervention-event stack, corresponding activating parameters are generated and, if the activating parameters exceed the predetermined threshold value, the second monitoring device is activated by an activating unit and a corresponding activating pulse.

53 Claims, 2 Drawing Sheets

Figure 1:
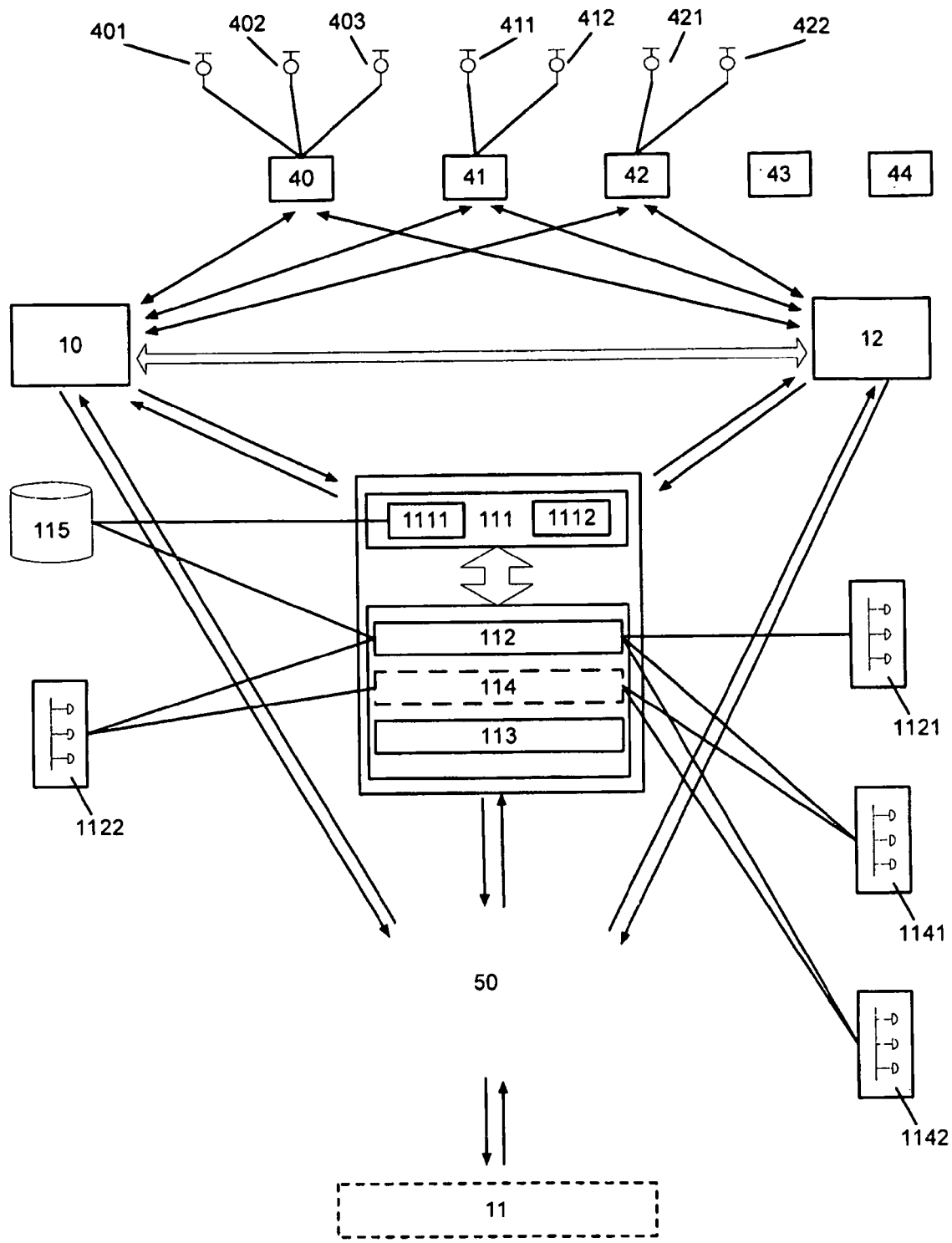

TRIGGERING AND ACTIVATING DEVICE FOR TWO COUPLED CONTROL SYSTEMS THAT CAN BE MUTUALLY ACTIVATED, AND CORRESPONDING METHOD

The invention relates to an automated triggering and activating device for coupling two reciprocally activatable monitoring systems or operational-intervention systems, the second monitoring device becoming activatable by means of the activating device when predefined threshold values are triggered. In particular, the activation of the first and/or second monitoring device can initiate operational monitoring and/or operational intervention by the monitoring devices in decentralised or centralised manner.

In the sensitive dynamics of today's markets, for industry and commerce—particularly for large-scale industry—the consequences of operational shutdowns or operational restrictions of individual key devices, entire plants, but also of external influences such as environmental catastrophes, high water, hurricanes, earthquakes, terrorist attacks, etc., can hardly be autonomously stabilised any longer. The shutdown of a memory-chip manufacturing plant in Japan/Korea in the 1990s, with its entire consequential effect on the associated manufacturers and markets, or the consequences of catastrophes and war-caused shutdowns of transport devices and conveying devices in the oil industry, may, for instance, be cited as famous examples. The roots of this phenomenon are to be sought, on the one hand, in the globalisation of the markets with global dynamic competition, in which production sites, products, labour forces etc. can be relocated rapidly and are relocated, on the other hand from the increasingly shorter production cycles in many fields. The increasingly more widespread stock-exchange coding of large enterprises can also strengthen correlations of instability effects to a great extent. The capital that is tied up in the international money markets is immense and follows its own dynamics, which are only partly correlated with the remaining market and are difficult to trigger. These reasons play a part in the fact that major operational shutdowns or operational restrictions in many industrial fields can hardly be recovered any longer nowadays without sophisticated monitoring systems and/or alarm-deployment systems and/or operational-intervention systems playing a part. Operational-intervention systems may be based on quite different foundations. For instance, in the case of a specific factory or production facility for defined cases they can intervene directly in automated or partly automated manner; in particular, they can take over, redirect or otherwise replace the technical operation of the plant. This can, for example, through the use of substitute devices (such as, for example, on the large cargo ships through the reciprocal activation/deactivation of substitute drive devices, activation/deactivation of emergency power units, cooling systems, support systems, taking account of the energy consumption etc. etc.). On the other hand, intervention systems based on monetary values are also known, such as, for example, damage-coverage systems, which intervene as a result of diversion and/or transfer of stored and assigned monetary values in cases of damage and which bridge operational shutdowns. It is clear that such mixed systems, i.e. systems based partly on monetary values, can also be useful and can also be found in the state of the art. Irrespective of how the operational-intervention systems are constructed, they necessarily include at least switching units and/or activating units. International patent application PCT/US00/21529 (CA 2 381 253) by ACE INA Holdings, Inc. Philadelphia (US) presents such a mixed operational-intervention system, whereby monetary values are transferred and, in return, the operational intervention is activated upon the occurrence of a definable and detectable event.

One of the basic problems of all these systems lies in the fact that automations and/or automated controls of the monitoring systems and operational-intervention systems are, for the most part, themselves very unstable and trouble-prone. One of the causes lies in the great complexity of the assigned technical plants and their interaction with the environment. Serial shutdowns and/or correlated operational shutdowns or faults—for example, due to environmental influences—are difficult to detect in advance or cannot be detected at all. In order to counter this vulnerability, inter alia multi-stage monitoring systems and/or intervention systems have been developed that complement one another in graduated manner and often satisfy different laws and measuring parameters. Such multi-stage systems are, for example, also a functional basis in the case of the monetary-value-based damage-coverage systems known in the state of the art. Known, inter alia, are systems with primary insurers and reinsurers or even multiple reinsurers. But these systems have also escaped technical automation almost completely until now, on account of the aforementioned reasons. As mentioned, the same also applies to the other monitoring systems and operational-intervention systems that are not based on the substitution of monetary value. They have also escaped automation entirely or at least partially, despite immense efforts on the part of the industry, on account of the stated instability and complexity. Accordingly, both in connection with logging and examination and in connection with intervention, enormous resources in terms of labour forces and expenditure of time are consumed, even nowadays. Due to the absence of automation, for the most part the systems also lack the necessary speed in order to be able to be receptive to changed conditions. Similarly, it is difficult to estimate the behaviour of the systems, since identical behaviour can seldom be reproduced without automation and, precisely in the case of chaotic systems, the smallest changes can have major consequences. This makes the systems of the state of the art delicate and difficult to examine.

The importance of operational-intervention systems for industry and economics can hardly be underestimated nowadays. In the USA alone, just the monetary-value-based operational-intervention systems, in particular the insurance industry, encompass a capital of 350 billion US dollars for safeguarding industrial plants and goods valued at about 30 trillion US dollars. This has led to the attempt, for the purpose of handling major catastrophic events (so-called CAT exposures) with correlated operational shutdowns, to couple such monetary-value-based operational-intervention systems to the financially strong capital market. But, despite enormous efforts on the part of the industry and despite the attempt to employ the latest technologies, the coupling of these systems to the capital markets also displays major problems, which have hardly been solved hitherto in the state of the art. One of the problems is that the risks for potential investors, also for instruments that are already established to some extent—such as, for example, CAT bonds—can hardly be estimated. Many of the systems in the state of the art include modules based on stochastic models of the operational interventions or operational shutdowns to be expected. In determining future events by means of these systems, at least two uncertainties always have to be taken into account: firstly, the choice of the stochastic model itself, and then the values that are utilised for the model. The stochastic models typically include a combination of Poisson processes, which the number of catastrophes occurring together with a probability distribution of the magnitude of the operational shutdowns in the case of each catastrophic event. The quantifying of the catastrophic events and the impact thereof on the catastrophe derivatives is one of the further problems in this case. It is known that several different modules of the state of the art can be combined for this purpose in order to obtain this quantification. Purchase-option spreads are ordinarily determined anew each time and compared with the current prices. The catastrophe derivatives presented here may, for example, include call spreads at the CBOT (Chicago Board Of Trade) and may have been generated on the basis of the PCS (Property Claim Services) loss index.

Since 1989 the number of major operational interventions and operational shutdowns resulting from catastrophes has risen steadily. In 1992 this sum of operational shutdowns and other damage coverages that were caused by hurricane Andrew amounted to 16 billion US dollars, and in 1994 it amounted to 12 billion US dollars as a result of the Northridge earthquake. The mean return period for 1 billion US dollars is less than one year, and for 15 billion US dollars it is about 25 years. In the case of monetary-value-based operational-intervention systems, insolvency caused by such catastrophes can cause serious disruptions, for which reason, as mentioned, a coupling by means of money-market instruments—such as CAT derivatives, for example—is attempted. Financial investors may, despite a risk that is difficult to predict, likewise be interested in CAT derivatives, since they permit a little-correlated, or even uncorrelated, risk support to the money markets.

Estimates of the error of the probability models may, for example, be obtained by means of Monte Carlo models or random models and operational-shutdown or damage-estimation procedures, and are known in the state of the art. Determination of the relationships between operational plants, damage estimations or operational-shutdown estimations, operational-intervention parameters (i.e. the conditions under which operational intervention is necessary) and also the financial general conditions, causes major difficulties. One possibility of the state of the art is based on the PCS (Property Claim Services), in that CAT derivatives or corresponding options are based on loss indices. The most widespread options are called spreads and show, in their general parameters, similarities to secondary-insurance contracts or reinsurance contracts. Typical reinsurance contracts are triggered by an agreed minimal threshold value for the amount of damages and are limited by a maximal payoff (for example, the activation is triggered by an amount of damages of 20 million US dollars with a maximal payoff of 10 million US dollars). Although CAT securities, such as corresponding stocks, may be based on the occurrence of risk events or cases of damage, they can be treated like conventional financial instruments. Consequently, in the state of the art the modelling of the cases of damage is usually based on historical data, for example generated by the PCS, or likewise on historical market prices. Historical data are, however, not always available or available on a sufficiently large scale, and changed conditions—such as population growth, developments in the operational plants, and changes in property ownership or property values—cannot be taken into account. For the most part, trading with these financial securities is also too slight to obtain reliable parameters. Technical problems also arise in connection with the taking into account of the fault susceptibility of the models that are used in relation to the accuracy of measurement of the parameters. The uncertainties may—for example, in the case of operational-intervention systems with reimbursement parameters, in particular monetary-value-based reimbursement parameters—greatly increase the uncertainty or the error when determining these parameters.

In the state of the art, CAT options have been generally known since 1992, since their trading for the first time at the Chicago Board of Trade (CBOT), and since July 1996 on the Bermuda Commodities Exchange (BCOE). The options are, in general, structured in such a way that triggering takes place if the operational shutdowns or the amount of damages according to the industry loss index exceed(s) a predefined threshold value. If this is the case, the difference between effective industry loss index and threshold value is determined, which is then borne by the CAT option. In the case of the CAT options, typically the following parameters are important: upper amount of damages, damage period, development period, compensation parameters or operational-intervention parameters, index-measuring parameters. The CBOT CAT options are based on several parameters. One of these is the so-called Property Claim Services PCS loss index, which is composed of nine indices: one national, five regional (East, West, . . . ) and three State indices for California, Florida and Texas. They are treated as so-called calls, puts or spreads. PCS call spreads include a so-called long call together with a first threshold value (strike price), which corresponds to a trigger index—allowing the operational-intervention system to cover damage or to implement operational interventions that lie above the first threshold value—and also a short call option with a higher second threshold value, triggering the window to the maximum payoff. BCOE Cat options are based on the so-called Guy Carpenter GCCI loss index, which specifies the level of the operational interventions or cases of damage reported to the ISO Insurance Service Organization.

CAT bonds are allocated to the investors by means of a Special Purpose Vehicle (SVP) in return for high rates of interest or other reimbursements. Considered technically, the SVP operates like a trust, which can make the CAT bonds almost free from credit risks. The transfer of the risks is realised by means of allocation of securities, the securities exhibiting a risk-coupled payoff structure. Since the issue of Cat bonds in 1996, inter alia the lack of standardisation when measuring the risk parameters has been one of the major obstacles to the use and trading of the CAT bonds on the market. By virtue of this poor transparency, the market is coupled with a major complexity and with correlations that are difficult to determine and for the most part limited for professional investors. For the most part, for the purpose of triggering the CAT bonds individual loss indices, for example of a defined insurance industry, or the aforementioned industry loss index, which generates a greater basic risk and a corresponding hazard. Two classes of CAT bonds are distinguished: (i) indemnity-based CAT bonds directly use the expense incurred by the operational-intervention system or by the monetary-value-based damage-coverage system as a threshold value parameter for the payout; (ii) index bonds or recapitalisation CAT bonds utilise industry index loss values (for example, PCS or GCCI). Important parameters to be determined of the CAT bonds are direct debtors or compilation of the corresponding portfolio (i.e. the units assigned to the operational-intervention system), transmitted time-interval of the risk, possibly reimbursement parameters, trigger level, risk index, geographical area assigned or covered.

Figure 2:
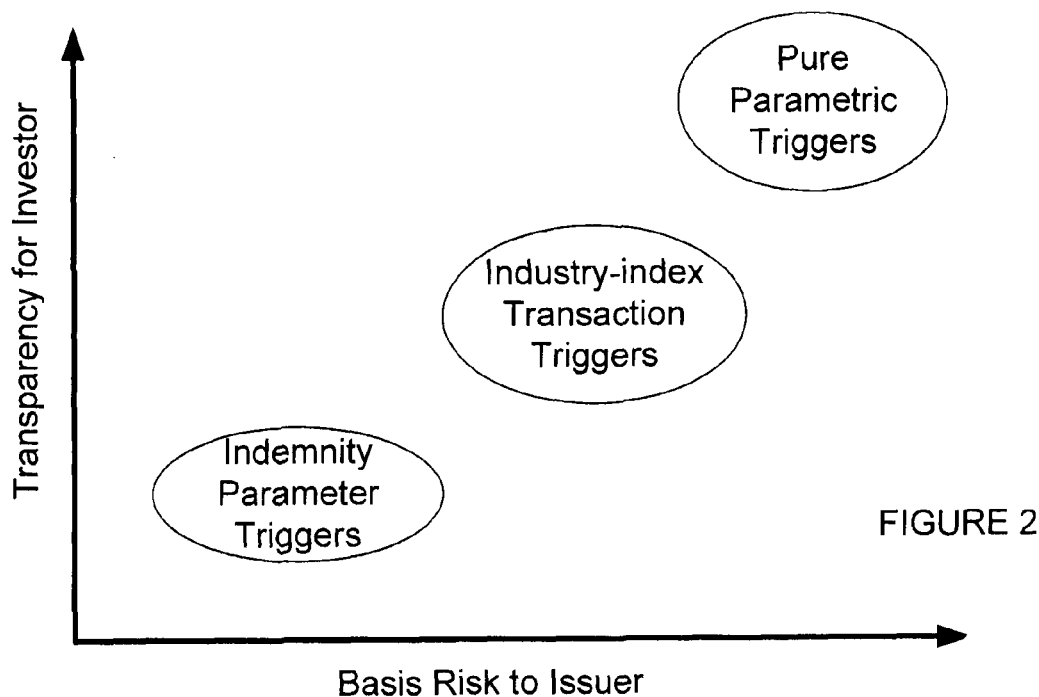

Many triggering systems for CAT bonds are to be found in the state of the art in order to bridge the compromise between transparency and basic risk. FIG. 2 shows the most important examples of the state of the art: (i) indemnity-parameter triggers are based on the effectively transferred indemnity or on the effective extent of the operational intervention by the operational-intervention system or monetary-value-based damage-coverage systems, such as, for example, the primary-insurance industry; (ii) industry-index transaction triggers are based on an industry-wide index of operational interventions or damages (for example, Property Claim Services or 'PCS' in the USA); (iii) pure parameter triggers are based on physical measuring parameters of the initiating risk event (for example, earthquake intensity on the Richter scale, or wind speeds in the case of cyclones); parametric index triggers are a modified form of the pure parameter triggers, which frequently utilise more complex interrelations and/or more detailed measuring locations or measuring units; (v) modelled-loss transaction triggers trigger on the basis of the effective physical measured quantities of the risk event in combination with simulated operational-intervention models, in order to determine the trigger values and to activate corresponding activating units.

A large number of other technologies and systems also exist in the state of the art in order to couple operational-intervention systems or damage-coverage systems with the money market, such as, for example, (a) Contingent Surplus Note CNS, in which the insurance industry issuing the CAT bond transmits the reimbursement parameters or proceeds transferred from the businesses assigned to the CAT bond to so-called treasury securities. Upon the occurrence of a catastrophic event that initiates the operational interventions the system can replace its own company bond with the treasury bond. The investors receive the interest and a corresponding bonus, i.e. corresponding monetary-value parameters are assigned to them, for the transfer of the option to the issuer (i.e. the operational-intervention system), to be able to transfer its own liabilities in the case of risk events to the treasury bond; (b) the so-called issuance-of-equity systems (transfer of capital, for example, in particular in the form of shares or securities). If the monetary-value-based operational-intervention system (such as, for example, damage-coverage systems or insurance industry) suffers great losses, then it itself becomes inoperative. The simple post-loss transfer (post-loss equity) is based on the assignment of new monetary-value parameters or on the issue of new securities at a reduced price, in order to cover the loss that has arisen as a result of the damage. In other words, post-loss equity financing is a process in order to release, in such monetary-value-based systems, non-liquid assets such as, for example, franchise values; (c) Cat equity put options (CE puts), which are another form of post-loss equity, in order to generate a put option onto the separate assets of the damage-coverage system at predefined price parameters. It gives the issuer system of the CAT bonds the option to transfer shares to the investor at a predetermined price if a risk event and/or the generated loss exceeds a defined threshold value. An extension in the CE puts is determining the so-called exercise window, whereby the loss generated by the catastrophe has to lie between an upper limiting value and a lower limiting value. Since these certainties are assigned to losses of individual risk events, the basic risk is relatively small. All these techniques of the state of the art can be used in combination with the inventive triggering and activating system.

The industry-index trigger, in the case of which an index parameter weighted by means of defined or fixed-weight parameters for different geographical units and branches of industry is incremented and which index value is generated by an index provider (such as, for example, PCS in the USA), is also designated as a so-called fixed-weight industry-index trigger or FII trigger and offers some technical improvements in comparison with a basic industry-index trigger (as described above) and may serve as an alternative to a modeled-loss trigger. Modeled-loss triggers and FII triggers encompass conflicting basic risks: (a) the FII trigger does not take account of differences in the market shares per event and geographical unit, i.e. it ignores known parameters relating to contractual or otherwise defined intervention terms (policy terms), inuring covers and the so-called underwriting criteria in a particular State (such as, for example, statutory standards) and also (b) modeled-loss triggers: connects the leading or market-dominating enterprises to the industry-level secondary uncertainties, which are not present in the FII trigger. The optimal trigger can, in the case of these two trigger modules, probably lie between these two extremes, depending on the corresponding transfer.

Further systems are to be found in the state of the art, which, in conjunction with CAT bonds or other derivatives, attempt to obtain at least a partial automation. To be mentioned, inter alia, is international patent specification WO 96/21903, which discloses a system and process for transfer of the risk. A further system is disclosed by international patent specification WO 01/08063, which in the case of systems with profits or returns determined by claims presents a risk support by means of derivatives. U.S. Pat. No. 5,202,827 presents a system for automation of the trading with insurance-linked securities, just as U.S. Pat. No. 5,704,045 presents a system for automated risk transfer by means of such derivatives and/or options.

It is an object of this invention to propose a system and corresponding process for an activating and synchronising device for coupling graduated, automated monitoring systems and/or intervention systems that do not exhibit the aforementioned disadvantages. In particular, it is to be a solution that permits such monitoring systems and/or operational-intervention systems to be automated without the systems losing stability. At the same time, by virtue of the automation the system is to have the aforementioned advantages of speed and savings in expenditure of time, etc.

According to the present invention, this objective is achieved, in particular, by the elements of the independent claims. Further advantageous embodiments are evident, in addition, from the dependent claims and the description.

In particular, these objectives are achieved by the invention in that the triggering and activating device for coupling two reciprocally activatable monitoring systems or operational-intervention systems a plurality of operational devices are assigned to the first monitoring device, and the second monitoring device is activatable by means of the activating device when predefined threshold values are triggered, in that by means of a first synchronising module transmissible operational-intervention parameters of a lookup table are synchronisable with the operational devices assigned to the first monitoring device and by means of a second synchronising module storable threshold-value parameters for activating the second monitoring device are synchronisable, in that physical measuring parameters of intervention events are detectable by means of corresponding logging devices and are transmissible to the activating device, whereby by means of a first filter module an intervention-event stack is incrementable on the basis of the physical measuring parameters and a dynamic weighting of the lookup table, and in that by means of the first filter module corresponding activating parameters can be generated on the basis of the synchronised threshold parameters and the Intervention-event stack and, if the activating parameters exceed the predetermined threshold value, the second monitoring device is activatable by means of the activating device. The event parameters may, for example, be normalised event-unit parameters. The activating device may, for example, be an integrated constituent part of an overall system of monitoring devices, but may also, for example, be arranged as a stand-alone network unit. The activating parameters may, for example, include the determinable threshold value. The invention has the advantage that, by virtue of the dynamic weighting of the lookup table in combination with the remaining features of the invention, a much greater accuracy and certainty in connection with the activation is obtained. At the same time, the transparency of the system rises considerably. The logging devices may, for example, include at least sensors for measuring physical event parameters of an intervention event, the sensors being assignable to a defined area and/or to at least one operational device. The activating parameters may, for example, include at least one of the definable threshold values. The first monitoring device may be activatable, in particular, for example, in the course of the transmission of event parameters. The invention further has the advantage that it remains perfectly stable also in the case of automation, particularly in the case of poorly detectable events with low statistical occurrence. A further advantage is that a reduction in the safeguarding parameters can be obtained in the case of the first monitoring device, making the system more competitive and better adapted. By virtue of the automation, the system can be adapted to new conditions rapidly and, in any case, dynamically. Hitherto this has not been possible in the state of the art. In other words, by virtue of the solution according to the invention a technical optimisation and automation of the systems is obtained that hitherto was not known in the state of the art.

In one embodiment variant, by means of a second filter module for a definable intervention event and/or time-interval all the available operational devices are filtered cumulatively in a memory unit, whereby a first event stack is incrementable on the basis of the transmitted physical measuring parameters and the accumulated operational devices, whereby by means of the second filter module a second event stack is incrementable on the basis of the operational interventions implemented in a manner assigned to the accumulated operational devices and whereby the generation of the activating parameters by means of the first filter module is carried out in addition on the basis of the first and second event stacks. The activating device may include a normalisation unit, whereby a second Intervention-event stack can be generated by means of the normalisation unit on the basis of the intervention stack normalised with the first event stack and on the basis of the second event stack, and whereby by means of the first filter module the activating parameters can be generated on the basis of the synchronised threshold parameters and the second intervention-event stack. This embodiment variant has, inter alia, the advantage that the weighting can be normalised. For the purpose of normalisation, the second intervention-event stack may, for example, also be based on the PCS (Property Claim Services) index or on a similar index. The accumulated operational devices of the lookup table may, for example, include all the assigned and unassigned operational devices of an intervention event and/or of a definable area.

In another embodiment variant the logging devices include means for dynamic detection and communication of the physical measuring parameters of intervention events. This embodiment variant has, inter alia, the advantage that it can react in automated manner to the most current events without further assistance. This can be done by means of the present device even in real time, if meaningful.

In a further embodiment variant the dynamic weighting of the lookup table is carried out in such a manner that current operational parameters of all the available or predetermined relevant operational devices are transmitted to the activating device by means of logging devices, and the individual operational devices of the lookup table are weighted correspondingly. This embodiment variant has, inter alia, the advantage that the weighting takes place on the basis of the most current assessment of the operational devices, for example on the basis of their technical output or on their market shares etc.

In one embodiment variant the logging devices include, at least partially, measuring devices with corresponding sensors for measuring the physical measuring parameters. The activating device may, for example, include a network interface, whereby via the network interface the activating device is connected to measuring devices distributed in decentralised manner, and the measuring devices are arranged in cellular, geographically and/or topologically definable units or zones and by means of the network interface geophysical, atmospheric and/or maritime measuring parameters are transmitted from the measuring devices to the activating device and/or are stored. The transmission of the measuring parameters from the measuring devices to the activating device may, for example, be effected periodically and/or upon request of the activating device. The transmission of the measuring parameters from the measuring devices to the activating device may, for example, also be effected in the event of predefinable threshold values being exceeded. The measuring devices may, for example, include measuring sensors which are connected to the measuring device via an air interface or a hard-wired interface or via an interface provided with a contact. Furthermore, the measuring sensors may, for example, include sensors for measuring water temperature and/or air temperature and/or seismic soil movements. This embodiment variant has, inter alia, the advantage that, in contrast to the state of the art, effective physical measured quantities can be used dynamically in parallel with model-based determinations. In particular, for example, the general parameters of the individual modules do not have to be fixed previously.

In another embodiment variant the activatable monitoring systems or operational-intervention systems are based on monetary values, whereby upon activation of the monitoring systems or operational-intervention systems storable and protected data elements are transmissible to the operational devices or to system units assigned thereto, which data elements include at least storable monetary values and/or corresponding data tokens. By means of the activating device, in the event of at least one of the threshold values being exceeded settlement data with settlement parameters for crediting and/or debiting monetary values are, for example, communicated in automated manner to a clearing module.

In yet another embodiment variant, monetary values transmitted from operational devices are at least partially logged and assigned to the monitoring devices. The triggering and activating device may, for example, include a clearing module, whereby clearing data can be communicated to the clearing module on the basis of the activating parameters, which clearing data include settlement data for the activation of the second monitoring device and/or feedback to the first monitoring device. By means of the clearing module, in accordance with the received clearing data the second monitoring device may, for example, be capable of being enabled for the purpose of activation and/or the first monitoring device may be capable of being fed back.

In both preceding embodiment variants, electronically signed settlement vouchers may be communicated, for example by means of the clearing module, to the corresponding monitoring device via the activating device or directly. Furthermore, for example, electronically signed monetary values and/or monetary-value tokens and/or billing vouchers may be communicated from the first monitoring device to the second monitoring device for the purpose of coupling. Both of these embodiment variants have the advantage that monetary-value-based systems can be fully and stably automated, something which has not been possible in any case in the state of the art hitherto.

In a further embodiment variant the triggering and activating device includes means for encrypted and access-controlled transmission of the activating pulse and/or of the activating parameters, whereby for the purpose of decrypting the access-controlled activating pulse in accordance with transmitted access-request data a data token can be generated and can be communicated to the corresponding monitoring device, the data token including in each instance data that include at least parts of a corresponding key to the access-controlled encrypted activating pulse, or an access permission to a key for decrypting the activating pulse. The data token may, for example, be encrypted and/or electronically signed. This embodiment variant has the advantage, particularly in the case of decentralised monitoring and activating devices arranged in a network, that the security of the system can be significantly enhanced without the advantages of the network coupling having to be given up. Quite generally, however, this embodiment variant has, inter alia, the advantage that the device allows a high security standard and a technically stable behaviour in the exchange between the systems. As mentioned, the data token may, for example, be encrypted and/or electronically signed. In particular, the encryption may be carried out, for example, via public-key cryptography, in particular SSL (Secure Sockets Layer) or HTTPS.

At this point it will be emphasised that, in addition to the process according to the invention, the present invention also relates to a system for executing this process and to a corresponding computer-program product.

In the following, embodiment variants of the present invention will be described on the basis of examples. The examples of the embodiments will be illustrated by the following appended Figures:

FIG. 1 shows a block diagram which shows schematically an activating and triggering device 11 which can be used for the purpose of realising the invention. Decentralised logging devices 401,402,403,411,412,413,421,422,423 detect corresponding events by means of sensors and/or measuring devices and transmit them by means of event parameters to a first monitoring device 10, whereby on the basis of an operation-specific activation corresponding to the transmitted event parameters a second monitoring device 12 is activatable by means of the first monitoring device 10.

FIG. 2 shows schematically in a block diagram the different types of trigger pertaining to the state of the art.

Figure 3:
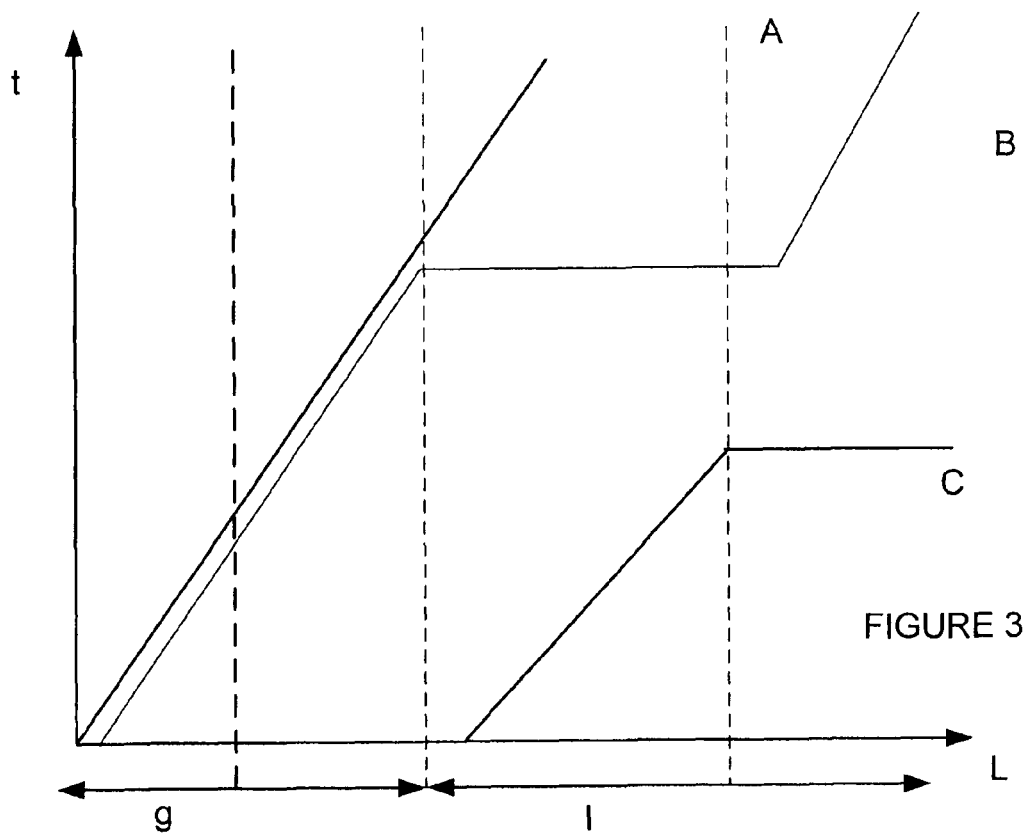

FIG. 3 illustrates by means of the curve an example of a ratio of transmitted event parameters. B shows the operational interventions to be borne by the first monitoring device 10, and C shows the range covered by the second monitoring device 12. In range g, for example, the ratio of transmitted event parameters to the interventions settled in full by the operational devices 40, . . . , 42 may be greater than 1, whereas I shows the range in which the ratio is less than 1. In the case of monetary-value-based devices, one also speaks of loss in the case of the first monitoring device 10. In the case of monetary-value-based systems, one also speaks of so-called SL processes (stop-loss) based on the totality of all the damages of a technical institution or for the duration of the SL process for monetary-value-based operational-intervention systems.

FIG. 1 illustrates an architecture that can be used for the purpose of realising the authentication of the invention. FIG. 1 shows a block diagram which schematically shows a device according to the invention and a corresponding process for coupling two reciprocally activatable monitoring systems or operational-intervention systems 10/12. A plurality of operational devices 40/41/42 are assigned to the first monitoring device. The second monitoring device 12 is activatable by means of the activating device 11 when predefined threshold values are triggered. By means of a first synchronising module 1111, transmissible operational-intervention parameters of a lookup table 115 are synchronisable with the operational devices 40/41/42 assigned to the first monitoring device 10 between monitoring device 10 and operational devices 40/41/42. By means of a second synchronising module 1112, storable threshold-value parameters for activating the second monitoring device 12 are synchronisable between the first monitoring device 10 and the second monitoring device 12.

Physical measuring parameters of intervention events are detected by means of corresponding logging devices 401/402/403; 411/412/413; 421/422/423 and transmitted to the activating device 11. The logging devices 401/402/403; 411/412/413; 421/422/423 may be arranged to be accessible in centralised or decentralised manner, for example via a network 50. The intervention events may include any type of necessity for operational interventions, whereby operational interventions may be based on operational shutdowns, operational restrictions, or any kind of damage to the business. Operational-intervention events may be, for example, natural events or natural catastrophes, such as, for example, earthquakes, floods, droughts, cyclones etc. They may also be operational shutdowns due to terror activities. But the intervention events may also be events such as fires, lengthy power-supply interruptions, or even events that are one's own fault, such as, for example, excessive ageing of the operational devices or improper handling or maintenance. By means of a first filter module 112, an intervention-event stack 1121 is incremented on the basis of the physical measuring parameters and a dynamic weighting of the lookup table 115. The intervention-event stack 1121 may be realised by software and/or hardware. Dynamic weighting of the lookup table 115 means that the operational devices are weighted with respect to one another only at the required time. This considerably enhances the accuracy and reliability of the system, despite the full automation. Similarly, there is a far greater measure of transparency than is the case with the conventional systems pertaining to the state of the art. In the state of the art a dynamic weighting of the operational devices 40, . . . , 42 was not possible so intrinsically.

By means of the first filter module 112, on the basis of the synchronised threshold parameters and the intervention-event stack 1121 corresponding activating parameters are generated and, if the activating parameters exceed the predetermined threshold value, the second monitoring device 12 is activated by means of the activating device 11. For the purpose of activation, the activating device 11 may generate at least one activating pulse and transmit it to the first and/or second monitoring device 10/12 via an interface. In particular, the activating device 11 may, for example, include means for dynamic activation of the first monitoring device 10 and/or second monitoring device 12. 'Dynamic' may mean, in particular, that the first and/or second monitoring device 10/12 can be activated by the activating device directly and/or in fully automated manner, i.e. it requires no further interaction by operators and/or modules/devices. The first monitoring device 10 can, for example, be activated in the course of transmitting event parameters. The event parameters may, for example, be generated by the operational devices 40, . . . , 42, but they may, for example, also be generated and transmitted by the logging devices and/or measuring stations 401/402/403; 411/412/413; 421/422/423. Event parameters may include, or be, normalised and/or protected and/or transmissible units as so-called event-unit parameters. The storable and protected event-unit parameters may also include, as an embodiment variant, for example, storable monetary values and/or corresponding data tokens. The activation may, for example, happen in the course of transmitting the event parameters to the first monitoring device and/or operational-intervention device 10 by means of the first monitoring device 10 itself, or the first monitoring device 10 is generated by means of the operational device 40, . . . , 42 concerned. As an embodiment variant, it may be more than sensible that the activating and triggering device 11 controls the activation of the first monitoring device, allowing an additional monitoring function and security by virtue of the activating device 11.

By means of a second filter module 114, in one embodiment variant for a definable intervention event and/or time-interval all the operational devices 40, . . . , 44 of a definable area and/or intervention event can be stored cumulatively in a memory unit, for example. A first event stack 1141 is incremented on the basis of the transmitted physical measuring parameters and the operational-intervention parameters of the accumulated operational devices 40, . . . , 44. By means of the second filter module 114 a second event stack 1142 becomes incrementable on the basis of the operational interventions carried out in a manner assigned to the accumulated operational devices 40, . . . , 44. The second event stack 1142 is based on transmitted parameters of the PCS (Property Claim Services) or on a similar public or private index. The generation of the activating parameters can then be realised, for example, by means of the first filter module 112 in addition on the basis of the first and second event stacks 1141/1142. The accumulated operational devices may include operational devices 40/41/42 assigned to the lookup table and unassigned operational devices 40/41/42 of an intervention event and/or of a definable topographical or geographical area. The second filter module 114 may, for example, include a normalisation unit, the normalisation unit generating a second intervention-event stack 1122 on the basis of the intervention stack 1121 normalised with the first event stack 1141 and on the basis of the second event stack 1142. The first filter module 112 then generates the activating parameters, for example on the basis of the synchronised threshold parameters and the second intervention-event stack 1122.

The logging devices 401/402/403; 411/412/413; 421/422/423 may, for example, include sensors for measuring physical event parameters of an intervention event. The sensors may have been assigned to a defined area and/or to one or more operational devices 40, . . . , 42. The physical measuring parameters of intervention events may, for example, be detected dynamically and/or in real time by means of corresponding logging devices 401/402/403; 411/412/413; 421/422/423. This allows the system to react immediately to changed conditions and to initiate operational interventions.

It is important to point out that the weighting of the lookup table is carried out dynamically, i.e. for example on the basis of changed conditions or upon request of the activating device 11. This can, for example, be realised by current operational parameters of all the available and/or predetermined relevant operational devices 40, . . . , 42 being transmitted to the activating device 11 by means of logging devices 401/402/403; 411/412/413; 421/422/423 and by the individual operational devices of the lookup table 115 being correspondingly weighted by means of the activating device 11. In the case of monetary-value-based systems, the weighting may, for example, also include a dynamic market analysis and weighting of the individual operational devices 40, . . . , 42 on the market by means of corresponding analysis modules. For this purpose, necessary parameters of the market can, for example, be drawn dynamically from official stock-exchange data, for example, etc. or from other databases and can be used.

As mentioned, the logging devices 401/402/403; 411/412/413; 421/422/423 may, for example, include at least partially measuring devices with corresponding sensors for measuring the physical measuring parameters. The activating device 11 may include a network interface or a plurality of network interfaces to one or more networks 50. Via the network 50 the activating device 11 may be connected, via the network interface, for example to measuring devices 401/402/403; 411/412/413; 421/422/423 which are distributed in decentralised manner. The measuring devices 401/402/403; 411/412/413; 421/422/423 may, for example, have been arranged in cellular, geographically and/or topologically definable units or zones, and by means of the network interface may transmit geophysical, atmospheric and/or maritime measuring parameters from the measuring devices 401/402/403; 411/412/413; 421/422/423 to the activating device 11. The measuring parameters may be transmitted from the measuring devices 401/402/403; 411/412/413; 421/422/423 to the activating device 11 periodically and/or upon request. The request may be generated by the activating device 11 and/or by one of the monitoring devices 10/12 and/or by one of the operational devices 40, . . . , 42 and/or by one of the logging devices 401, . . . , 422. The measuring parameters from the measuring devices 401/402/403; 411/412/413; 421/422/423 may, for example, also be transmitted to the activating device 11 in the event of predefinable threshold values being exceeded. The measuring devices 401/402/403; 411/412/413; 421/422/423 may, for example, include measuring sensors which are connected to the measuring device via an air interface or a hard-wired interface or via an interface provided with a contact. The measuring sensors may, for example, include sensors for measuring water temperature and/or air temperature and/or seismic soil movements. But they may also include sensors for measuring operational parameters of the operational devices 40, . . . , 42.

In one embodiment variant, in the case of monetary-value-based, activatable monitoring systems or operational-intervention systems 10/12 for the purpose of activating the monitoring systems or operational-intervention systems 10/12 storable and protected data elements, for example, can be transmitted to the operational devices 40, . . . , 42 or to system units assigned thereto. The data elements may, for example, include storable monetary values and/or corresponding data tokens. The activating device 11 may, for example, in the event of at least one of the threshold values being exceeded, communicate settlement data with settlement parameters for crediting and/or debiting monetary values to a clearing module in automated manner. The monetary values transmitted from operational devices 40/41/42 may, for example, be at least partly logged and assigned to one of the two monitoring devices 10/12 or to both monitoring devices 10/12. As an embodiment variant, the triggering and activating device 11 may, for example, additionally include a clearing module, whereby clearing data are communicated to the clearing module on the basis of the activating parameters. The clearing data may, for example, include settlement data for the activation of the second monitoring device 12 and/or feedback or coupling of the first monitoring device 10. By means of the clearing module, in accordance with the received clearing data, for example, the second monitoring device 12 can be enabled for the purpose of activation and/or the first monitoring device 10 can be fed back. The activating parameters may include at least one of the definable threshold values. By means of the clearing module, electronically signed settlement vouchers, for example, can be communicated to the corresponding monitoring device 10,12 via the activating device 11 or directly. Similarly, electronically signed monetary values and/or monetary-value tokens and/or billing vouchers, for example, can be communicated from the first monitoring device 10 to the second monitoring device 12 for the purpose of coupling. The triggering and activating device 11 may, for example, include means for encrypted and access-controlled transmission of the activating pulse and/or of the activating parameters, whereby for the purpose of decryption of the access-controlled activating pulse in accordance with transmitted access-request data a data token is generated and is communicated to the corresponding monitoring device 10,12. The data token may, for example, in each instance include data that include at least parts of a corresponding key to the access-controlled encrypted activating pulse, or an access permission to a key for decrypting the activating pulse. The data token may, for example, be encrypted and/or electronically signed. The encryption may be carried out, for example, via public-key cryptography, in particular SSL (Secure Sockets Layer) or HTTPS.

As an embodiment variant, it may furthermore be sensible that, for example, parameterised operational risks are transmitted from a plurality of user devices 40, . . . , 42 to the first monitoring device 10 by means of corresponding parameters, whereby, in accordance with the transmitted operational risks, event parameters and/or corresponding monetary-value amounts of the user devices 40, . . . , 42 are incremented to the intervention-event stack of the access-controlled memory unit.

As mentioned, in the case of monitoring systems and operational-intervention systems 10/12 the triggering and activating device 11 may relate to an extremely wide range of fields of technology and to an extremely wide range of types of monitoring functions and/or operational interventions. The multi-stage monitoring, surveillance and/or operational-intervention systems may be technical devices within a factory or a technical plant. But they may also relate to centralised systems that initiate a corresponding operational intervention by means of activating signal by the activating device according to the invention, such as, for example, alarm systems, damage-combating systems (for example, extinguishing systems, locking systems, supply-control systems, control devices for the reciprocal activation/deactivation of substitute drive devices, for example on large cargo ships, activation/deactivation of emergency power units, cooling systems, support systems, taking account of the energy consumption, alerting systems etc. etc.). As an embodiment variant, the invention may also relate to is automated or partly automated operational-intervention systems based on transferable monetary values, such as, for example, damage-intervention systems, which are activated by the triggering and activating device 11 according to the invention. The activation of the monitoring systems 10/12 would signify in this special case the coverage that has arisen in the corresponding operational device 40, . . . , 42. The exemplary embodiment of automated or semi-automated damage-coverage systems may, for example, also include insurance systems 10 and reinsurance systems 12. The damage-coverage system or damage-intervention system includes a transferable damage-coverage amount which corresponds to the coverage of a damage of a monitoring device 10/12 or of an operational device 40, . . . , 42 assigned to the lookup table 115 (the user device can then be referred to as 'insured'), and which is assigned to the user device in the case of the accumulation of a risk and/or damage for a defined technical operational device 40, . . . , 42 or damage event in general. In particular, such damage and/or damage events may include, for example, high-water catastrophes and/or floods and/or earthquakes. By way of indemnity, the transfer includes a reimbursement and/or bonus to the damage-intervention system in favour of this coverage. This has already been explained above technically. For an automated insurance system, it may, for example, be sensible that the activating process includes a transmission from the second monitoring device 12, such as, for example, boundary-condition parameters corresponding to a reinsurance contract. By means of the synchronisation of the first and second monitoring devices 10/12 the first monitoring device 10 (in this case, the automated insurance system) transfers, or the first monitoring device 10 transmits, to the second monitoring device 12 a part of the risk which the first monitoring device 10 has accepted, on the basis of the operational-intervention parameters, from operational devices 40, . . . , 42 assigned to the lookup table 115. In the second monitoring device 12 this transmission may, in particular, have been, or be, assigned to a portfolio of risks and/or risk record which, for example, includes homogeneous and/or complementary risks and/or risk records and results in a technically monitorable support of the system. By means of a corresponding module of the second monitoring device 12, this can be obtained by correlations being checked and filtered. Particularly in the case of monetary-value-based monitoring devices 10/12, for example by means of an analysis module of the activating device 11 and/or of the monitoring device 10,12 two storable threshold-value parameters $S_1$ and $S_2$ of a first interval $F_1$ may include. For this interval $F_1$ the second monitoring device 12 is correspondingly activatable. Likewise they may, for example, include two further storable threshold-value parameters $S_1'$ and $S_2'$ of a second interval $F_2$ of expected values, for which expected values the first monitoring device 10 is fed back to the second monitoring device 12. The parameters $S_1$, $S_2$, $S_1'$ and $S_2'$ are capable of being varied by means of the synchronising modules 1111,1112, whereby the synchronising modules 1111,1112 activate the analysis module for such time until the parameters lie within a definable variance. The second interval $F_2$ may, for example, include expected-value parameters for probabilities of accrual, for which expected-value parameters in the course of the sequence of the definable and synchronised time window the intervention-event stack 1121 includes non-decremented event-unit parameters.

Operational interventions by monitoring devices 10/12 may also, quite generally, include transmitted, parameterised operational risks of operational devices 40, . . . , 42. These parameterised and/or parameterisable operational risks may be transmitted to the first monitoring device 10 by a plurality of operational devices 40, . . . , 42 by means of corresponding parameters. In accordance with the transmitted operational risks, corresponding monetary-value amounts are transmitted from the operational devices 40, . . . , 42, for example to an access-controlled memory unit assigned to the first and/or second monitoring device 10/12. Of course, the memory unit may also pertain to specialised systems of third-party providers, such as, for example, corresponding financial institutions. Similarly, quite generally the triggering and/or activating device 11 according to the invention may have been realised either as a stand-alone network unit with an interface to the network 50, but also as a unit directly assigned to the first and/or the second monitoring device 10/12. If the triggering and/or activating device 11 has been realised as a network unit, it may also have been realised, as in the case of content providers, as a chargeable service for monitoring devices 10/12. The monitoring devices 10/12 may in this case access chargeable services of the activating and/or synchronising device 11, for example via an interface. In this regard the monitoring device 10/12 may, upon a request, communicate an IMSI stored on a SIM card of the monitoring device 10/12 to a control-gateway module, the IMSI of the monitoring device 10/12 being stored in a database of a SIM-RADIUS module. The monitoring devices 10/12 and/or the triggering and activating device 11 may be provided with the necessary infrastructure, including hardware components and software components, in order to realise the described process and/or system. The first and/or second monitoring device 10/12 and/or the triggering and activating device 11 may, for example, include one or more different physical network interfaces which may also support several differing network standards. The physical network interfaces may, for example, include interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another wired LAN (Local Area Network) etc. Accordingly, the network 50 may stand for various heterogeneous networks, such as, for example, a Bluetooth network, for example for installations in covered localities, a mobile-radio network with GSM and/or UMTS etc., a wireless LAN, for example based on IEEE wireless 802.1x, but also on a wired LAN, i.e. on a local fixed network, in particular also on the PSTN (Public Switched Telephone Network) etc. As a matter of principle it should be stated that the process and/or system is not tied to a specific network standard—provided that the features according to the invention are present—but may, if it has been realised via a network 50, be realised with an arbitrary LAN. The interfaces may be not only packet-switched interfaces, such as are utilised directly by network protocols such as, for example, Ethernet or token ring, but also circuit-switched interfaces, which can be utilised by means of protocols such as, for example, PPP (Point to Point Protocol), SLIP (Serial Line Internet Protocol) or GPRS (Generalized Packet Radio Service) i.e. which interfaces, for example, do not possess a network address such as a MAC address or a DLC address. As mentioned in part, the communication can be effected via the LAN, for example by means of special short messages, for example SMS (Short Message Services), EMS (Enhanced Message Services), via a signalling channel, such as, for example, USSD (Unstructured Supplementary Services Data) or other technologies, such as MExE (Mobile Execution Environment), GPRS (Generalized Packet Radio Service), WAP (Wireless Application Protocol) or UMTS (Universal Mobile Telecommunications System) or via IEEE wireless 802.1x or another useful channel. The monitoring devices 10/12 and/or the triggering and activating device 11 may, for example, even include a mobile IP module and/or an IPsec module. The main task of the mobile IP consists in authenticating the, in any case, mobile monitoring devices 10/12 and/or triggering and activating devices 11 in the IP network and in correspondingly redirecting the IP packets which the corresponding monitoring device 10/12 and/or triggering and activating device 11 have as destination address. With respect to the further mobile IP specifications, see also, for example, IETF (Internet Engineering Task Force) RFC 2002, IEEE Comm. Vol. 35 No. 5 1997 etc. Mobile IP supports, in particular, IPv6 and IPv4. The mobile IP capabilities may preferably be combined with the security mechanisms of an IPsec (IP security protocol) module, in order to guarantee a secure mobile data management in the public Internet. IPsec (IP security protocol) generates, packet-wise or socket-wise, authentication/confidentiality mechanisms between network nodes that both utilise IPsec. One of the flexibilities of IPsec lies, in particular, in the fact that it can be configured packet-wise but also for individual sockets. IPsec supports IPvx, in particular IPv6 and IPv4. For more detailed IPsec specifications, see, for example, Pete Loshin: IP Security Architecture; Morgan Kaufmann Publishers; 11/1999 or A Technical Guide to IPsec; James S et al.; CRC Press, LLC; 12/2000 etc. Although in this exemplary embodiment IPsec has been described as an example of the use of security protocols on the IP level, in accordance with the invention all other possible security protocols or mechanisms, or even the omission of security protocols, are conceivable.

In the exemplary embodiments with monetary-value-based monitoring systems or operational-intervention systems 10/12—such as, for example, automated damage-coverage systems—the triggering and activating device 11 is suitable, in particular, for the different automated or semi-automated systems for damage coverage by coupling of a second monitoring device 12, such as, for example, also for reinsurance systems. With the invention, for example, processes for upper damage limitation—i.e. with a threshold value for the monetary values assigned to a damage event, sometimes also referred to in the state of the art as 'stop-loss' processes or 'SL' processes—can be realised. In this case the second monitoring device 12 is only activated by means of transmission if the annually incremented intervention-event parameters of the intervention-event stack—i.e. the annual sum or the sum of another definable time unit of the monetary values of the damage coverages (for example, the monetary values transmitted by a specific user device, such as, for example, of an insurer)—exceeds a definable or predetermined threshold value (for example, as one of the synchronised parameters) ('stop loss'). A classical SL process includes the following elements and parameters: (i) a definable threshold value as upper limiting value for the loss in the case of damage coverages, or a definable franchise corresponding to a limiting value, so that the definable, transferable monetary values are unambiguously assured; (ii) a definable, maximal, transferable monetary value for the second monitoring device 12 (for example of the reinsurance system), corresponding to a maximum monetary value which is accepted by the second monitoring device 12; (iii) the fee parameters, which correspond to the reimbursement and/or to the bonus parameters which are received by the second monitoring device 12, for example the reinsurance system, as indemnity for the risk transferred to it; (iv) A definable time-interval for the duration of the agreed process, which, for example, may be set at one year or several years. But any other time intervals are also conceivable in principle. For the exemplary embodiments with activating and/or synchronising device and money-based monitoring devices 10/12, at least one of the monitoring devices 10,12 or the activating device 11 has to determine the quantities, the risk value of which is assignable to a defined damage category. The best equilibrium between the two quantity parameters is determined by means of the first monitoring device 10. On the basis of this equilibrium an upper threshold value and/or limiting value for the loss limit is determined. This threshold value for the loss limit corresponds to the maximum monetary value of the damage coverage which the first monitoring device 10 alone accepts or for which it alone is activated. The determination of equilibrium can also be carried out jointly for several operational devices 40, . . . , 42 of the first monitoring device 10.

In one embodiment variant, in the course of the various synchronising stages, for example, the first monitoring device 10—i.e. in this case, for example, the assignor—can propose to one or more second monitoring devices 12—in this case, for example, reinsurance systems—a is quantity parameter for the risk to be transferred, which is assigned to one or more damage coverages, if a definable threshold value for the monetary value of the loss is exceeded. Thereupon the second monitoring device 12 examines on its side, for example by means of a Monte Carlo module, the transmitted parameters on the basis of the probability factors for the accrual of a risk and the activating of the second monitoring device 12. In the course of the activation the second monitoring device may also act as a type of relay device. It may be sensible that only the global value of the risks and their characteristics are transmitted, but not the detailed process or analysis of the first monitoring device 10, i.e. of the assignor.

In the course of synchronisation the second monitoring devices 12 may in turn, for example for the purpose of determining the risk parameters that are assigned to one or more defined operational devices 40, . . . , 42 of a first monitoring device 10, include corresponding means for the correct modelling of the operational interventions or damage cases to be expected. The determination may be based not only on 'normal' cases of damage but also, in addition, on extraordinarily rare and/or unusually common cases. The second monitoring devices 12 may in this case, for example, include means for determining the bonus parameters or the monetary values, which in return for the acceptance of the risks by the assignor, i.e. the first monitoring device 10, are to be reimbursed to the second monitoring device 12, as well as the upper threshold value, in the case of which the acceptance of risk by the reinsurance system is limited. This also may constitute a part of the synchronisation according to the invention. The determination of the bonus parameters may, for example, be effected on the basis of the stated modelling. The second monitoring device 12 may, for example, include a variable upper threshold value, for example if the first monitoring device 10 proposes, i.e. communicates, a larger time-interval for the purpose of damage coverage (optionally or non-optionally), and infers a correspondingly higher bonus therefrom. The second monitoring device 12 may, in particular, include means in order differing monetary values for bonuses corresponding to the acceptance of differing levels of risk, for example on the basis of the magnitude of the coverage means (for example, available monetary values) of the second monitoring device 12 and/or of the coverage structure of the first monitoring device 10. Appropriate simulation modules may, for example, provide a damage curve for activating the first monitoring device 10 and may be realised, as mentioned, by means of Monte Carlo modules for example, with the Monte Carlo modules including the necessary hardware components and/or software components. On the basis of the damage curve, the second monitoring device 12 determines the magnitude of the monetary values for the reimbursement. For example, the second monitoring device 12 can carry out the determination of the monetary values for the bonuses in accordance with differing levels of the acceptance of risk before it carries out the synchronisation by means of transmission with the first monitoring device 10 of the boundary conditions, i.e. inter alia of the monetary values and/or the level of the transfer of risk. The level of the acceptance of risk includes the threshold value of the level of loss, corresponding to a maximum value which is accepted by the first monitoring device 10, and to the maximum value of the damage coverages, which has to be accepted by the second monitoring device 12 for the transferred monetary values of the bonuses.

On the basis of the aforementioned transfers the second monitoring device 12 may, in the case of monetary-value-based systems, quite generally accept potential magnitude units of defined risks which have been transferred to the first monitoring device 10 (for example, the insurer) under defined conditions. These conditions may, in particular, include the fact that the real level of these risks (for example, number and extent of operational interventions to be carried out and/or damage and/or damage reports) does not exceed a defined level. In other words, the second monitoring device 12 becomes active or is activated only from a definable level or quantity parameter of the risks and, starting from there, accepts the risks and/or damage for which the first monitoring device 10 should actually have been active. The magnitude or level of the risks for which the second monitoring device 12 is activatable by means of transfer can itself again be limited in the upward direction by a definable threshold value. In return, the second monitoring device 12 can be reimbursed for the service furnished by the first monitoring device 10, for example by means of transferred monetary values. The reimbursement may typically be effected by the first monitoring device 10 in advance, i.e. for a period of time still pending, such as, for example, before a year of accrual for accepting the risks. But in principle the converse is also conceivable, for example. The second monitoring device 12 (in the case of monetary-value-based systems as an embodiment variant, for example the reinsurance systems) includes the means that are necessary for activatability. These may, in particular, likewise include transferable monetary values. The second monitoring device 12 likewise includes means for determining the risks. These means may, for example, include statistical expert modules, for example on the basis of the law of large numbers. It may be advantageous if the second monitoring device 12 is activatable by a group of first monitoring devices 10, which first monitoring devices 10 include a homogeneous mixture of transferred risks in a defined technical field. The second monitoring device 12 and/or the first monitoring device 10 can access databases that include statistical data, stored in a manner assigned to different risks. The access may be effected in access-controlled manner, bidirectionally and/or unidirectionally. The second monitoring device 12 and/or the first monitoring device 10 may include filter modules, in order to assign statistical data to a definable risk and/or technical field, if the data of the databases do not include this assignment. The correct functioning of the analysis means—in particular, for example, of the statistical expert modules and/or of the filter modules for a technical field—is important for the system, since poorly or incorrectly calculated risks directly influence the activation of the second monitoring device 12. The incorrect analysis can also influence and falsify values for future risks. In other words, the overall system will no longer behave predictably upon the occurrence of defined risks. In the extreme case, as a result the function of the system may not only be impaired but may fail completely. The system includes, in general, device-specific means for synchronisation of the boundary conditions of the transmission between the second monitoring device 12 and the first monitoring device 10. These means may be activated in automated or partly automated manner on the basis of the statistical forecasts. The activation is based at least on the synchronisation of the reimbursement (for example, by means of monetary values), depending on the acceptance of definable risks and on the probability of occurrence of the risks.

The first and/or second monitoring devices 10/12 and/or the triggering and activating device 11 may include a memory unit (for example, the history modules) for the assigned storage of statistical data for a defined technical device or field, whereby the data include, by means of weight quantities, risks for operational interventions, depending on their temporal occurrence, for example the flooding risks or frequency of occurrence of floods as a function of the years of accrual. Furthermore, an analysis device and/or filter device for filtering the relevant data relating to a definable risk and to the automated modelling of the corresponding structures, in order to determine the probabilities of future events or risks. The devices may likewise, for example, include a first variable parameter which is assigned to a first threshold value $V_1$, based on the probability of occurrence of the defined risk, depending on the damage coverages associated therewith in a first chosen interval $F_1$. The stored weight quantities of the memory unit may be, for example, relative proportional quantities without dimension, for example the ratio S/P or a ratio of possible losses, whereby for an accruing year the damage quantity S includes, for example, a monetary value for the coverage of damage reports or damages of the first monitoring device 10, i.e. for example of the assignor, and the size of the bonus P, for example a monetary value for the monetary values transmitted from the first monitoring device 10 to the second monitoring device 12 for the reimbursement of the accepted risks. Although the dimensionless parameter S/P was used here in exemplary manner, other corresponding variable parameters are also possible, however. For instance, it may be entirely sensible to operate the system by means of absolute parameters, since the ratio of the risks/damage to the bonuses is at least statistically determinable.

In the case of the monetary-value-based systems the aforementioned statistical data may include, in particular, for example, value parameters for the ratio of the damage to the reimbursement/bonuses, assigned to the respective years of accrual. The data may likewise include parameters that effectively or only possibly have an influence on future operational-intervention events or damage events or risks, for example influence on the frequency of accrual or severity of accrual etc. By means of the stated analysis means, the statistical data can be evaluated and/or filtered, for example on the basis of corresponding models, and S/P or a corresponding parameter can be determined on the basis of the evaluation of the parameters. By means of the parameter S/P the synchronisation of the first monitoring device 10 and of the second monitoring device 12 is carried out. In particular, the activation of the second monitoring device 12 is effected as described above, on the basis of this synchronisation. A storable intermediate parameter $G_E$ may, for example, include the ratio of damages to bonuses, to which the value 100% may also have been assigned. Of course, the process is also possible without this parameter. The analysis means may, as an embodiment variant, determine the most probable values, for example by means of a statistical process of the next interval, starting from the chosen starting-point. These processes may, for example, include the process of the greatest probability, of the smallest standard deviation, of $\chi^2$, Kolmogorov-Smirnov, Anderson-Darling etc. The purely statistical process steps cease here. As mentioned, it can be advantageous that the analysis means includes one or more statistical process modules, such as, for example, a Monte Carlo module, a generator for different future models and/or a variation module for varying the parameters. iv) The analysis means choose the parameters in such a manner that the curve obtained coincides best with the integrated behaviour of all possible scenarios, in which connection the scenarios in the past never had to have been realised. Conversely, the possibility can also be minimised that the curve does not coincide with, or sufficiently approximate to, the behaviour of past events. Statistical data or historical data are in such a manner with the analysis means, by means of corresponding models and/or scenarios, projected into the year of accrual or period of time to be determined or translated into a curve of parameters that is utilised by the system for the purpose of synchronisation between a first monitoring device 10 and the second monitoring device 12 and/or for the purpose of activating the transfer.

By way of embodiment variant, the first monitoring device 10 may, for example, transmit the necessary parameters, for example via the network 50, to the second monitoring device 12 and/or to the triggering and activating device 11. In this case the second monitoring device 12 determines, by means of the aforementioned analysis means via a storable parameter, the technical expected value $V_1$ as a threshold value for the loss-rate for determining the reimbursement that has to be transmitted from the first monitoring device 10 to the second monitoring device 12, or which rate has to be borne by the first monitoring device 10, and which by the second monitoring device 12. The communications network 50 includes, as mentioned, for example, a GSM network or a UMTS network, or a satellite-based mobile-radio network, and/or one or more fixed networks, for example the publicly switched telephone network, the worldwide Internet or a suitable LAN (Local Area Network) or WAN (Wide Area Network). In particular, it also includes ISDN and XDSL connections. The threshold-value parameter $S_1$ corresponds nominally to the maximum value of the loss or damage that has to be covered by the central unit alone. This loss or damage can, for example, be determined in advance by the first monitoring device 10 and communicated as boundary-condition parameter to the second monitoring device 12 or activating and synchronising device 11. The threshold-value parameter $S_2$ corresponds nominally to the upper limit, above which the second monitoring device 12 no longer accepts the risk from the first monitoring device 10 for damage coverage. The second monitoring device 12 may vary the parameter $S_2$, depending on the technical expected value for the reimbursement. The variation may proceed until such time as the second monitoring device 12 receives a confirmation of the acceptance by the first monitoring device 10. This procedure is a part of the synchronisation and is effected by means of the synchronising module 1111/1112 or the synchronising device 111. The synchronisation between the second monitoring device 12 and the first monitoring device 10 may, for example, also include condition parameters such as level of reimbursement, time of reimbursement (for example, the fact that the second monitoring device 12 is activated for damage coverage at the end of the year). The second monitoring device 12 is activatable whenever the effective loss-rate or damage-rate lies within the interval $S_1$ and $S_2$ or above the interval, for example for a coverage period (for example, one year) for which the reimbursement was transferred to the second monitoring device 12.

The basic industry-index trigger of the state of the art was developed in such a way that it was able to reduce the risk to be borne by the first monitoring devices 10 for operational interventions or the uncertainty in the probability of an operational intervention by the first monitoring device 10. A basic industry-index trigger system or a corresponding activation is based on an industry-wide index of operational interventions and/or damage reports, such as, for example, the Property Claim Services or 'PCS' in the USA. The fixed-weight industry-index trigger systems 'FII', likewise already mentioned and known in the state of the art, activate on the basis of predefined shares of the operational devices 40, . . . , 42 in a defined industry sector (for example, 5% share of the Californian Commercial Line PCS). Both triggering systems of the state of the art utilise predefined weighting parameters, impairing the transparency. Similarly, the uncertainty of the systems of the state of the art on account of this inflexibility can be considerable and, above all, barely definable. This hardly permits a full automation based on the known triggering systems. In contrast thereto, in the case of the inventive triggering and activating device 11 the weighting is effected in event-specific manner and dynamically on the basis of a variable weighting of the market shares or output rate of the operational devices 40, . . . , 42. As explained in detail above, the inventive triggering and activating device 11 sets the weighting on a post-event basis, i.e. at the time when the event triggering the operational intervention occurs, or afterwards. In this way, the inventive triggering and activating device 11 can considerably reduce the basic risk or the uncertainty in the probability of an operational intervention in comparison with the basic industry-index trigger or the FII trigger systems of the state of the art. In the case of monetary-value-based systems the trigger 11 according to the invention resembles an industry-index trigger from the investor side, with all the associated advantages. The triggering and activating device 11 according to the invention is, however, much more diversified for the investor than, for example, FII trigger systems, since, by definition, it is much less correlated with other industrial damage. Although it appears to be more complex, it is nevertheless far more transparent than a pure industry-index trigger. The much greater transparency of the system according to the invention arises by virtue of the additional process step, which a correspondingly deeper understanding of the composition of the portfolio of the operational devices 40, . . . , 42, i.e. of the first monitoring device 10 by means of operational devices 40, . . . , 42 assigned to the lookup table 115, and hence also of the impact of the portfolio on a bond, for example.

For the purpose of realising the second filter module 114, different processes and systems of the state of the art may also be used, for example. It may, inter alia, also be the purpose of these processes to determine the development of a loss index, in order to obtain the prices for derivatives in the case of coupled bond systems. Each PCS index point corresponds to US$100 million of damage interventions insured by the systems (i.e. an index value of 50 corresponds in the case of monetary-value-based systems to a damage of US$5 billion). Some processes of the state of the art use the LM loss index in a manner similar to the integrated value in a diffusion process based on a modified Black-Scholes process. For the system according to the invention, for this embodiment variant a range of stochastic processes for the determination of the probability of the operational interventions can, for example, in particular using a jump process in conjunction with composed Poisson processes. In the case of the monetary-value-based systems the parameters can, for example, be derived from the traded market prices or stock-exchange parameters. In the options money market, for example, the derivatives can by filtering the volatility of the traded monetary values. The same can also by means of corresponding analysis modules with determination of corresponding expected values and examination for consistency with the effective prices. In the case of connections to the insurance-derivative market that are coupled to the inventive system, similar technical realisations are possible. A suitable operational-intervention distribution or loss distribution may, for example, be determined, and the corresponding parameters may be determined by means of a module realised in such a manner, based on the measured or observed market values. Subsequently the magnitude of the operational interventions or damage interventions is determined, converted to monetary values, and compared with the effective prices by means of a filter module.

Many such processes are to be found in the state of the art, such as, for example, disclosed by C. Vorm Christensen (2000) 'Implied Loss Distribution for Catastrophe Insurance Derivatives', CAF Working Paper Series No. 80, Centre for Analytical Finance, University of Aarhus. The PCS call-spread monetary value can, for example, be determined by means of a selection of differing processes for the loss index. The market prices that are used may, for example, originate from the National PCS call spreads, as is specified by the CBOT, which includes both the bid monetary values and the demanded monetary values for call spreads, for example in the form of a range [40,60] to [200,250]. As mentioned, it can be advantageous that the modules are realised, for example, on the basis of composed Poisson processes. By means of the Poisson process the number or frequency of the catastrophic events can be represented, the identical independent variables (for example, gamma distribution or Pareto distribution) represent the so-called loss-jump quantity, and the constants represent the minimal threshold value for the index. The monetary value taken into account for the comparison may, for example, be the value of the PCS call spread at time 0. The deterministic parameters may, for example, be used for each of the statistical processes known in the state of the art. The parameters may, for example, be chosen in such a manner that they are based on a function based on the following: the theoretical monetary value should lie between the supply price and the demand price, and the theoretical monetary value should, for example, preferably lie in the middle between bid and demanded monetary value or price. The output of the loss-model module may, for example, be the expected insurance-damage liability and/or the price sensitivity of the option, depending on a variation of these parameters.

If the inventive triggering and activating device 11 is compared with the FII trigger systems of the state of the art, the differences can be clearly seen: for the inventive activating device 11, in the so-called pre-closing phase, i.e. for the inventive system in the synchronising phase, a fixed operational-device portfolio is. In other words, the operational devices 40, . . . , 42 assigned to the lookup table 115 are fixed. The expected values for the operational interventions or of the modelled damage may be based on risk analysis. In the risk phase, i.e. in the period in which the triggering and activating device 11 couples to the monitoring devices 10/12, a reimbursement can be transferred, for example by the operational devices 40, . . . , 42, for example with an annual reset. Of course, other time parameters can also be chosen, without the range of protection of the invention being affected. Ultimately comes the time at which an event (earthquake etc.) may occur that results in an operational interruption or operational impairment or any other operational damage. In the determination of the magnitude of the operational interventions or of the damage, the industry index for the event can be determined, for example, and the market shares of the operational device 40, . . . , 42 or of the enterprise are determined on the basis of the aforementioned modelled-loss techniques and processes. Then the operational intervention to be activated or the damage to be reimbursed is determined by the triggering and activating device 11 and initiated. In the case of the FII trigger of the state of the art, in addition to the fixing of the portfolio the weighting of the operational devices is also effected already in the pre-closing phase. Then the risk to be expected is determined, and the reimbursement is established. The expected value of the damage can likewise be determined on the basis of risk analysis. If ultimately an event occurs, for the determination of the damage the industry index for the event is determined and the reimbursement is initiated. This triggering system is based on fixed weightings of the operational devices on the market for the determination of the operational intervention. This is in complete contrast to the dynamic determination of the weightings of the lookup table 115 in the case of the inventive triggering and activating device 11. It is clear that, as an exemplary embodiment, instead of the weighting of the operational devices 40, . . . , 42 the market shares of the first monitoring device 10 can also be dynamically weighted directly.

|  | FII | (US$ in millions) | VII | (US$ in millions) |
|---|---|---|---|---|
| Pre-Closing | The industry portfolio is specified. The weighting of the market shares of the first monitoring device (for example, the ceding company) is determined on the basis of the corresponding branches of industry etc., for example the shares of the branches of commerce in California: From the risk analysis the benchmark of the expected values of the damage is determined on the basis of the fixed weighting and the composition of the portfolio. | 5% | Operational devices 40, . . . , 42 assignment to the lookup table 115 is implemented (or industry portfolio determined) From the risk analysis the benchmark of the expected values of the damage is determined on the basis of the composition of the portfolio. | |
| Risk or activation period | Remuneration is transferred to the first monitoring device, the annual reset takes place. An earthquake occurs in Los Angeles | | Remuneration is transferred to the first monitoring device, the annual reset takes place. An earthquake occurs in Los Angeles | |
| Operational-intervention or damage determination | Typically the PCS issues a first estimate of the insured industry damage within the first two weeks, and the definitive estimate in 6 months. PCS issues a catastrophe bulletin which specify an amount of damages of the branches of commerce in California of: | US$ 10,000 | Typically the PCS issues a first estimate of the insured industry damages within the first two weeks, and the definitive estimate in 6 months. PCS issues a catastrophe bulletin which specify an amount of damages of the branches of commerce in California of: | US$ 10,000 |
| | The trigger determines the damage of the first monitoring device as a product of the above fixed weighting of 5% of the market shares in California and the PCS industrial-damage value: | US$ 500 | The inventive activating device 11 determines the damage on the basis of the physical parameters of the earthquake and the portfolio specified by means of the lookup table 115: | US$ 800 |
| | | | The activating device 11 determines the | US$ 11,000 |

| FII | (US$ in millions) | VII | (US$ in millions) |
|---|---|---|---|
| | | accumulated damage: The activating device 11 determines dynamically the weighting of the lookup table 115: | % 7.27 |
| | | The activating device 11 therefore yields a loss of the first monitoring device 10 with: | US$ 727 |
| No contractual loss has occurred, since the US$500 million damage does not exceed the US$600 million retention. | | Contractual loss has occurred, since the monetary value of US$727 million exceeds the US$600 million retention. Hence the activating device 11 has triggered a contractual loss, and the second monitoring device 12 is activated by means of the activating device 11 in the amount of: | US$ 127 |

It is important to point out that in the above exemplary embodiment with monetary-value-based monitoring devices 10/12 a Cat bond layer of US$ 200 mm xs US$600 mm was assumed.

REFERENCE LIST

10 First monitoring device
11 Triggering and activating device
111 Synchronising device
1111 First synchronising module
1112 Second synchronising module
112 First filter module
1121 Incrementable first intervention-event stack
1122 Incrementable second intervention-event stack
113 Activating unit
114 Second filter module
1141 First event stack
1142 Second event stack
115 Synchronised lookup table
12 Second monitoring device
40,41,42 Assigned operational device
401-403; 411-413; 421-423 Logging/measuring device
43,44 Unassigned operational devices
50 Network

The invention claimed is:

1. A triggering and activating device for coupling two reciprocally activated monitoring devices or operational-intervention devices, a plurality of operational devices having been assigned to a first monitoring device, and a second monitoring device being activated by the triggering and activating device when at least one predefined threshold value is triggered, comprising:
a processor;
a first synchronizing module, implemented on the processor, by which transmitted operational-intervention parameters of a lookup table are synchronized with the operational devices assigned to the first monitoring device, and a second synchronizing module by which stored threshold-value parameters for activating the second monitoring device are synchronized,
wherein physical measuring parameters of intervention events are detected by corresponding logging devices and transmitted to the triggering and activating device, an intervention-event stack being incremented by a first filter module on the basis of the physical measuring parameters and a dynamic weighting of the lookup table, and
by the first filter module corresponding activating parameters are generated on the basis of the synchronized threshold parameters and the intervention-event stack and, when the activating parameters exceed the at least one predefined threshold value, the second monitoring device is activated by the triggering and activating device.

2. The triggering and activating device according to claim 1, wherein by a second filter module for at least one of a defined intervention event and a defined time-interval, all the operational devices of at least one of a defined area and the defined intervention event are accumulated in a memory unit, a first event stack being incremented on the basis of the transmitted physical measuring parameters and the operational-intervention parameters of the accumulated operational devices, a second event stack being incremented by the second filter module on the basis of the operational interventions carried out in a manner assigned to the accumulated operational devices, and the generation of the activating parameters by the first filter module being carried out in addition on the basis of the first and second event stack.

3. The triggering and activating device according to claim 2, wherein the second filter module includes a normalization unit configured to generate a second intervention-event stack on the basis of the intervention-event stack normalized with the first event stack and the second event stack, and the first filter module including means for generating the activating parameters on the basis of the synchronized threshold parameters and the second intervention-event stack.

4. The triggering and activating device according to claim 2, wherein the accumulated operational devices include operational devices assigned to the lookup table and unassigned operational devices corresponding to at least one of the defined intervention event, a defined topological area, and a defined geographical area.

5. The triggering and activating device according to claim 1, wherein the logging devices includes at least sensors for measuring physical event parameters of an intervention event, the sensors being assigned to at least one of a defined area and at least one operational device.

6. The triggering and activating device according to claim 1, wherein the first monitoring device is activated in the course of the transmission of event parameters.

7. The triggering and activating device according to claim 1, wherein the logging devices include means for dynamic detection and communication of the physical measuring parameters of intervention events.

8. The triggering and activating device according to claim 1, wherein the dynamic weighting of the lookup table is carried out, by logging devices, such that current operational parameters of all the available or predetermined relevant operational devices are transmitted to the triggering and activating device, and the individual operational devices of the lookup table are configured to be weighted correspondingly.

9. The triggering and activating device according to claim 1, wherein the logging devices include at least partially measuring devices with corresponding sensors for measuring the physical measuring parameters.

10. The triggering and activating device according to claim 9, wherein the triggering and activating device includes a network interface, the triggering and activating device being connected via the network interface to measuring devices distributed in a decentralized manner, and wherein the measuring devices are arranged in at least one of cellular, geographically defined units or zones, and topologically defined units or zones, and by the network interface geophysical, at least one of atmospheric and maritime measuring parameters are transmitted from the measuring devices to the triggering and activating device and stored.

11. The triggering and activating device according to claim 9, wherein the transmission of the measuring parameters from the measuring devices to the triggering and activating device is at least one of effected periodically and effected upon request of the triggering and activating device.

12. The triggering and activating device according to claim 9, wherein the transmission of the measuring parameters from the measuring devices to the triggering and activating device is effected in the event of the at least one predefined threshold value being exceeded.

13. The triggering and activating device according to claim 9, wherein the measuring devices include measuring sensors that are connected to the measuring device via one of an air interface, a hard-wired interface, and via an interface including a contact.

14. The triggering and activating device according to claim 9, wherein the measuring sensors include sensors for measuring at least one of water temperature, air temperature, and seismic soil movements.

15. The triggering and activating device according to claim 1, wherein the activated monitoring devices or operational-intervention systems are based on monetary values, whereby upon activation of the monitoring devices or operational-intervention devices, stored and protected data elements are transmitted to the operational devices or to system units assigned to them, which data elements include at least one of stored monetary values and corresponding data tokens.

16. The triggering and activating device according to claim 15, wherein in the event of at least one of the threshold values being exceeded, settlement data with settlement parameters for at least one of crediting and debiting monetary values to a clearing module are communicated in automated manner by the triggering and activating device.

17. The triggering and activating device according to claim 16, wherein monetary values transferred from operational devices are at least partially logged and assigned to the monitoring devices.

18. The triggering and activating device according to claim 17, wherein electronically signed settlement vouchers are communicated to the corresponding monitoring device via the triggering and activating device or directly by the clearing module.

19. The triggering and activating device according to claim 16, wherein the triggering and activating device includes a clearing module, clearing data being communicated to the clearing module on the basis of the activating parameters, which clearing data include at least one of settlement data for the activation of the second monitoring device and feedback of the first monitoring device.

20. The triggering and activating device according to claim 19, wherein by the clearing module, in accordance with the received clearing data, at least one of the second monitoring device is activated and the first monitoring device is enabled to receive feedback.

21. The triggering and activating device according to claim 1, wherein the activating parameters include the at least one predefined threshold value.

22. The triggering and activating device according to claim 1, wherein at least one of electronically signed monetary values, monetary-value tokens, and billing vouchers are communicated from the first monitoring device to the second monitoring device for the purpose of coupling.

23. The triggering and activating device according to claim 1, wherein the triggering and activating device includes means for encrypted and access-controlled transmission of at least one of an activating pulse and of the activating parameters, whereby for purpose of decryption of the access-controlled activating pulse in accordance with transmitted access-request data a data token is generated and is communicated to the corresponding monitoring device, the data token including, in each instance, data that includes at least parts of a corresponding key to the access-controlled encrypted activating pulse, or an access permission to a key for decrypting the activating pulse.

24. The triggering and activating device according to claim 23, wherein the data token is at least one of encrypted and electronically signed.

25. A triggering and activating process for coupling two reciprocally activated monitoring systems or operational-intervention devices by a triggering and activating device, a plurality of operational devices being assigned to a first monitoring device, and the triggering and activating device activating a second monitoring device by at least one predefined threshold value that is predefined in the course of triggering, the process comprising:

synchronizing, by a first synchronizing module, transmitted operational-intervention parameters of a lookup table with the operational devices assigned to the first monitoring device, and synchronizing, by a second synchronizing module, stored threshold-value parameters for activating the second monitoring device;

detecting, by logging devices, physical measuring parameters of intervention events and transmitting them to the triggering and activating device, whereby a first filter module increments an intervention-event stack on the basis of the physical measuring parameters and a dynamic weighting of the lookup table; and on the basis of the synchronized threshold parameters and the intervention-event stack, the first filter module generating corresponding activating parameters and, when the activating parameters exceed the at least one predefined threshold value, activating the second monitoring device by means of the triggering and activating device.

26. The triggering and activating process according to claim 25, wherein by a second filter module for at least one of a defined intervention event and a defined time-interval, all the operational devices of at least one of a defined area and the defined intervention event are accumulated in a memory unit, a first event stack being incremented on the basis of the transmitted physical measuring parameters and the operational-intervention parameters of the accumulated operational devices, a second event stack being incremented by the second filter module on the basis of the operational interventions carried out in a manner assigned to the accumulated operational devices, and the activating parameters being generated by the first filter module in addition on the basis of the first and second event stacks.

27. The triggering and activating process according to claim 26, wherein the second filter module includes a normalization unit, the normalization unit generating a second intervention-event stack on the basis of the intervention-event stack normalized with the first event stack and on the basis of the second event stack, and the first filter module generating the activating parameters on the basis of the synchronized threshold parameter and the second intervention-event stack.

28. The triggering and activating process according to claim 26, wherein the accumulated operational devices include operational devices assigned to the lookup table and unassigned operational devices corresponding to at least one of the defined intervention event, and a defined area.

29. The triggering and activating process according to claim 26, wherein at least one of the second event stack and the intervention-event stack is based on transmitted parameters of one of property claim services (PCS) and a related index.

30. The triggering and activating process according to claim 25, wherein the logging devices include at least sensors for measuring physical event parameters of an intervention event, the sensors being assigned to at least one of a defined area at least one operational device.

31. The triggering and activating process according to claim 25, wherein the first monitoring device is activated in the course of the transmission of event parameters.

32. The triggering and activating process according to claim 25, wherein the physical measuring parameters of intervention events are detected dynamically by corresponding logging devices.

33. The triggering and activating process according to claim 25, wherein the weighting of the lookup table is carried out dynamically, by current operational parameters of at least one of all the available and predetermined relevant operational devices being transmitted to the triggering and activating device by logging devices, and the individual operational devices of the lookup table being correspondingly weighted by the triggering and activating device.

34. The triggering and activating process according to claim 25, wherein the logging devices include at least partially measuring devices with corresponding sensors for measuring the physical measuring parameters.

35. The triggering and activating process according to claim 34, wherein the triggering and activating device includes a network interface, the triggering and activating device being connected via the network interface to measuring devices distributed in a decentralized manner, and wherein the measuring devices are arranged in at least one of cellular, geographically defined units or zones, and topologically defined units or zones, and by the network interface geophysical, at least one of atmospheric and maritime measuring parameters are transmitted from the measuring devices to the triggering and activating device and stored.

36. The triggering and activating process according to claim 34, wherein the measuring parameters are transmitted from the measuring devices to the triggering and activating device at least one of periodically and upon request.

37. The triggering and activating process according to claim 34, wherein the measuring parameters are transmitted from the measuring devices to the triggering and activating device in the event of the at least one predefined threshold value being exceeded.

38. The triggering and activating process according to claim 34, wherein measuring devices include measuring sensors that are connected to the measuring device via one of an air interface a hard-wired interface, and an interface including a contact.

39. The triggering and activating process according to claim 34, wherein the measuring sensors include sensors for measuring at least one of water temperature, air temperature, and seismic soil movements.

40. The triggering and activating process according to claim 34, wherein the activated monitoring systems or operational intervention devices are realized in a manner based on monetary values, whereby upon activation of the monitoring systems or operational-intervention devices, stored and protected data elements are transmitted to the operational devices or system units assigned to them, which data elements include at least one of stored monetary values and corresponding data tokens.

41. The triggering and activating process according to claim 40, wherein in the event of at least one of the threshold values being exceeded the triggering and activating device communicates settlement data with settlement parameters for at least one of crediting and debiting monetary values to a clearing module in an automated manner.

42. The triggering and activating process according to claim 41, wherein monetary values transferred from operational devices are at least partially logged and assigned to the monitoring devices.

43. The triggering and activating process according to claim 41, wherein electronically signed settlement vouchers are communicated to the corresponding monitoring device by the clearing module via the triggering and activating device or directly.

44. The triggering and activating process according to claim 25, wherein the triggering and activating device includes a clearing module, clearing data being communicated to the clearing module on the basis of the activating parameters, the clearing data including at least one of settlement data for the activation of the second monitoring device and feedback of the first monitoring device.

45. The triggering and activating process according to claim 44, wherein by the clearing module, in accordance with the received clearing data, at least one of the second monitoring device is activated and the first monitoring device is enabled to receive feedback.

46. The triggering and activating process according to claim 25, wherein the activating parameters include the at least one predefined threshold value.

47. The triggering and activating process according to claim 25, wherein at least one of electronically signed monetary-amount values, monetary-value tokens, and billing vouchers are communicated from the first monitoring device to the second monitoring device for the purpose of coupling.

48. The triggering and activating process according to claim 25, wherein the triggering and activating device includes means for encrypted and access-controlled transmission of at least one of an activating pulse and the activating parameters, whereby for the purpose of decrypting the access-controlled activating pulse in accordance with transmitted access-request data a data token is generated and is communicated to the corresponding monitoring device, the data token including, in each instance, data that includes at least parts of a corresponding key to the access controlled encrypted activating pulse, or an access permission to a key for decrypting the activating pulse.

49. The triggering and activating process according to claim 48, wherein the data token is signed in at least one of encrypted form and electronically.

50. The triggering and activating process according to claim 49, wherein the encryption is effected via public-key cryptography, or SSL (Secure Sockets Layer) or HTTPS.

51. The triggering and activating process according to claim 25, wherein the triggering and activating device includes means for dynamic activation of at least one of the first monitoring device and the second monitoring device.

52. The triggering and activating process according to claim 25, wherein parameterized operational risks are transmitted from a plurality of user devices to the first monitoring device by at least one of corresponding parameters, event parameters, and corresponding monetary-value amounts of the user, devices being incremented to the intervention-event stack of an access-controlled memory unit in accordance with the transmitted operational risks.

53. A non-transitory computer-readable storage medium having computer readable program codes for triggering and activating coupling of two reciprocally activated monitoring systems or operational-intervention devices, by a triggering and activating device, a plurality of operational devices being assigned to a first monitoring device, and the triggering and activating device activating a second monitoring device based on at least one predetermined threshold value that is predefined in the course of triggering, the computer readable program codes being embodied in the computer readable storage medium that, when executed cause a computer to execute synchronizing, by a first synchronizing module, transmitted operational-intervention parameters of a lookup table with the operational devices assigned to the first monitoring device, and synchronizing, by a second synchronizing module, stored threshold-value parameters for activating the second monitoring device;

detecting, by logging devices, physical measuring parameters of intervention events and transmitting them to the triggering and activating device, whereby a first filter module increments an intervention-event stack on the basis of the physical measuring parameters and a dynamic weighting of the lookup table; and on the basis of the synchronized threshold parameters and the intervention-event stack, the first filter module generating corresponding activating parameters and, when the activating parameters exceed the at least one predetermined threshold value, activating the second monitoring device by the triggering and activating device.

* * * * *